United States Patent [19]

Nesheiwat

[11] Patent Number: 4,748,231
[45] Date of Patent: May 31, 1988

[54] REPRECIPITATION OF POLY(ARYLENE SULFIDE) TO INCREASE MOLECULAR WEIGHT THEREOF

[75] Inventor: Afif M. Nesheiwat, Bartlesville, Okla.

[73] Assignee: Phillips Petroleum Company, Bartlesville, Okla.

[21] Appl. No.: 934,233

[22] Filed: Nov. 21, 1986

[51] Int. Cl.$^4$ .............................................. C08G 75/14
[52] U.S. Cl. ..................................... 528/486; 521/40; 528/388; 528/488; 528/499
[58] Field of Search ................ 525/537; 528/388, 486, 528/488, 499; 521/40

[56] References Cited

U.S. PATENT DOCUMENTS

| | | | |
|---|---|---|---|
| 3,919,177 | 1/1975 | Campbell | 260/79.1 |
| 4,071,509 | 1/1978 | Edmonds, Jr. | 260/79 |
| 4,089,847 | 5/1978 | Edmonds, Jr. et al. | 260/79.1 |
| 4,415,729 | 11/1983 | Scoggins et al. | 528/388 |
| 4,524,200 | 6/1985 | Sherk et al. | 528/388 |

FOREIGN PATENT DOCUMENTS 235838  1/1985  Japan.
166368  6/1985  United Kingdom.

*Primary Examiner*—Harold D. Anderson
*Attorney, Agent, or Firm*—Williams, Phillips & Umphlett

[57] ABSTRACT

The molecular weight of linear and non-linear poly(arylene sulfide) PAS is increased by reprecipitation. The reprecipitation is accomplished by heating PAS to its dispersion temperature in a mixture of polar organic solvent, water, and alkali metal carboxylate until the PAS is dispersed in the mixture. Water is then added to cause a phase separation, then the total mixture is slowly cooled and a PAS of increased molecular weight is recovered. PAS slime, a waste product of some polymerization processes, can also be reprecipitated, as above, to recover useful particulate PAS that would normally be discarded.

47 Claims, No Drawings

REPRECIPITATION OF POLY(ARYLENE SULFIDE) TO INCREASE MOLECULAR WEIGHT THEREOF

BACKGROUND OF THE INVENTION

This invention relates to a process for the production of poly(arylene sulfide). In one aspect, this invention relates to a process of producing high molecular weight linear poly(arylene sulfide). In another aspect, this invention relates to the recovery of useable poly(arylene sulfide) from low molecular weight slime. In still another aspect, this invention relates to the recovery of particulate poly(arylene sulfide) of higher molecular weight from a low molecular weight poly(arylene sulfide) waste.

In applications such as in the production of fibers and films from arylene sulfide polymers, linear poly(arylene sulfide) is preferred to branched types. It is desirable that the linear poly(arylene sulfide) have as high a molecular weight as possible in order to meet specialized product specifications. While high molecular weight non-linear poly(arylene sulfide) can readily be made by the addition of branching agents, such as trichlorobenzene, to the polymerization process, high molecular weight linear poly(arylene sulfide) cannot be made by this method. Previous methods to produce high molecular weight poly(arylene sulfide) without the use of branching agents include crosslinking the polymer, extracting impurities from the polymer, and the use of modifying materials such as sodium carboxylate in the polymerization process.

It would be beneficial if an improved method could be devised to produce high molecular weight linear poly(arylene sulfide).

Linear and non-linear poly(arylene sulfide)s can be produced by various processes using polyhalo-substituted aromatic compounds such as dihalobenzenes and trihalobenzenes. After the poly(arylene sulfide) is polymerized, the poly(arylene sulfide) must be recovered from the polymerization mixture. There are several processes for recovering linear and non-linear poly(arylene sulfide)s from the polymerization mixture. Two such processes are the solvent flashing process and the water quench process. In the water quench process of recovering these poly(arylene sulfide)s, a waste product called poly(arylene sulfide) "slime" is separated from the useful product. The slime separated in this process contains low molecular weight poly(arylene sulfide) fines and heretofore has been generally discarded.

It would be beneficial if a method could be devised to recover some useful product out of this discarded low molecular weight poly(arylene sulfide) material in the slime.

OBJECTS OF THE INVENTION

It is an object of the present invention to provide a process for increasing the molecular weight of linear poly(arylene sulfide).

It is a further object of this invention to provide particulate linear poly(arylene sulfide) of high molecular weight.

It is yet a further object of this invention to provide a process for obtaining a useful particulate product of increased molecular weight from poly(arylene sulfide) waste.

It is still a further object of this invention to provide useful poly(arylene sulfide) from waste poly(arylene sulfide) fines.

It is still a further object of this invention to provide a process for increasing the molecular weight of non-linear poly(arylene sulfide).

SUMMARY OF THE INVENTION

In accordance with one aspect of this invention, linear poly(arylene sulfide) resin is heated to its dispersion temperature in a mixture of polar organic solvent, alkali metal carboxylate, and, if necessary, water, until the resin is dispersed into the mixture. The resin is then reprecipitated by adding a sufficient amount of water while maintaining the mixture at about the dispersion temperature to cause a phase separation followed by slow cooling and recovery of high molecular weight linear poly(arylene sulfide).

In accordance with another aspect of this invention, poly(arylene sulfide) fines are heated to their dispersion temperature a mixture of polar organic solvent, alkali metal carboxylate, and, if necessary, water, until the fines are dispersed in the mixture. Sufficient water is then added to this mixture to cause a phase separation followed by slow cooling and recovery of granular poly(arylene sulfide) of increased molecular weight.

In accordance with yet another aspect of this invention, non-linear poly(arylene sulfide) resin, sometimes called branched poly(arylene sulfide), is heated to its dispersion temperature in a mixture of polar organic, alkali metal carboxylate, and, if necessary, water, until the resin is dispersed into the mixture. The resin is then reprecipitated by adding a sufficient amount of water while maintaining the mixture at about the dispersion temperature to cause a phase separation followed by slow cooling and recovery of higher molecular weight non-linear poly(arylene sulfide).

Even though linear poly(arylene sulfide) is the polymer most benefited by the present invention it is envisioned that the molecular weight of non-linear poly(arylene sulfide) can also be increased according to the present invention.

DETAILED DESCRIPTION OF THE INVENTION

Reprecipitation of Linear Poly(arylene sulfide)

In accordance with the first aspect of this invention, linear poly(arylene sulfide) resins of high molecular weight are produced by adding linear poly(arylene sulfide), such as linear poly(phenylene sulfide) to a mixture of polar organic solvent, alkali metal carboxylate, and, if needed, a resin stabilizing amount of water. This mixture is heated to the dispersion temperature of the linear poly(arylene sulfide) in the polar organic sovlent. This dispersion temperature is maintained until the linear poly(arylene sulfide) is dispersed in the remainder of the mixture. This dispersed linear poly(arylene sulfide) is then reprecipitated by the addition of sufficient water while maintianing the dispersion temperature, to cause a phase separation followed by slow cooling and recovery of high molecular weight linear poly(arylene sulfide) resin.

According to this first aspect of this invention, the poly(arylene sulfide)s most benefited by this process are linear poly(arylene sulfide)s since high molecular weight non-linear poly(arylene sulfide)s can easily be made by the addition of branching agents, such as trihalogenated aromatic monomers, to the polymerization reaction. Linear poly(arylene sulfide)s treated according to this invention will increase in molecular weight while retaining the linear structure.

Reprecipitation of Poly(arylene sulfide) Fines

In the second aspect of this invention, poly(arylene sulfide) fines are recovered and reprecipitated. Poly(arylene sulfide) fines are produced when poly(arylene sulfide), either linear or non-linear, is recovered by the water quench recovery process. In the water quench recovery process, water is added to the polymerization reaction mixture to phase separate the poly(arylene sulfide) from the polar organic solvent. A slime fraction containing poly(arylene sulfide) fines is separated from the useful granular poly(arylene sulfide). Such a process is disclosed in U.S. Pat. No. 4,415,729, the disclosure of which is incorporated herein by reference.

In this second aspect of the present invention, the slime which contains poly(arylene sulfide) fines is added to a mixture of polar organic solvent, alkali metal carboxylate, and, if needed, an amount of water sufficient to stabilize the poly(arylene sulfide). This mixture is heated to the dispersion temperature of the poly(arylene sulfide) in the polar organic solvent. This dispersion temperature is maintained until the poly(arylene sulfide) fines are dispersed in the balance of the mixture. The dispersed poly(arylene sulfide) is then reprecipitated by the addition of sufficient water to cause a phase separation while maintaining the high dispersion temperature follwoed by slow cooling (about 0.2° to 1° C. per minute) until at least about 200° C. preferably 150° C. This process produces a high yield (about 75%) of granular poly(arylene sulfide) product of increased molecular weight.

Reprecipitation of Non-Linear Poly(arylene sulfide)

In accordance with the third aspect of this invention, non-linear poly(arylene sulfide) resins of high molecular weight are produced by adding non-linear poly(arylene sulfide), such as non-linear poly(phenylene sulfide), to a mixture of polar organic solvent, alkali metal carboxylate, and, if needed, a resin stabilizing amount of water. This mixture is heated to the dispersion temperature of the non-linear poly(arylene sulfide) in the polar organic solvent. This dispersion temperature is maintained until the non-linear poly(arylene sulfide) is dispersed in the remainder of the mixture. This dispersed non-linear poly(arylene sulfide) is then reprecipitated by the addition of sufficient water while maintaining the dispersion temperature, to cause a phase separation followed by slow cooling and recovery of higher molecular weight non-linear poly(arylene sulfide) resin.

Preparation of Linear Poly(arylene sulfide)

The linear poly(arylene sulfide)s, according to this aspect of this invention, can be prepared by contacting alkali metal sulfide and a dihaloaromatic, preferably p-dihalobenzene, in a polar organic solvent under polymerization conditions to produce linear poly(arylene sulfide). One method of preparing linear poly(arylene sulfide)s is disclosed in U.S. Pat. No. 3,919,177, the disclosure of which is incorporated herein by reference. It is important for this aspect that this polymerization be conducted in the absence of polyhalogenated aromatics that cause branching since this will produce a less desirable high molecular weight non-linear poly(arylene sulfide).

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution.

p-Dihalobenzenes which can be employed by the process of this invention can be represented by the formula

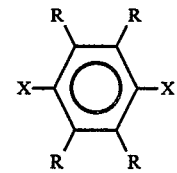

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24.

Examples of p-dihalobenzenes which can be employed in the process of this invention include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, and the like, and mixtures of any two or more thereof.

The polar organic solvents useful in the present invention are solvents for the halo aromatic compounds and the alkali metal sulfides used in the production of arylene sulfide polymers. Examples of such polar organic solvents include amides, including lactams, and sulfones. Specific examples of such polar organic solvents include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, low molecular weight polyamides, and the like. The polar organic solvent presently preferred is NMP.

Although the reaction temperature at which the polymerization is conducted can vary over a wide range, generally it will be within the range of about 420° F. to about 600° F., preferably about 435° F. to about 540° F. The reaction time can vary widely, depending in part on the reaction temperature, but generally will be within the range of about 10 minutes to about 72 hours, preferably about 1 hour to about 8 hours. The pressure should be sufficient to maintain the N-methyl-2-pyrrolidone, and the halo aromatic compound or compounds substantially in the liquid phase.

In accordance with this first aspect of the invention, the particular method chosen for recovery of the polymer from the polymerization step is not critical. The polymer can be recovered by any known method such as the solvent flashing process or the water quench process. It is believed that the present process can be employed to increase the molecular weight of linear poly(arylene sulfide) no matter what initial recovery process is used, since my invention lies in reprecipitation of the polymer according to my process.

Preparation of Poly(arylene sulfide) Fines

According to the second aspect the polymerization process can be as described above for the linear poly(arylene sulfide) or, alternatively, in addition to the dihalobenzene at least a portion of a polyhaloaromatic compound having more than two halogen substituents per molecule, can also be present, thereby forming a non-linear branched poly(arylene sulfide).

Polyhaloaromatic compounds having more than two halogen substituents per molecule which can be employed can be represented by the formula $R'X'_n$, where $X'$ is selected from the group consisting of chlorine and bromine, preferably chlorine, n is an integer of 3 to 6, and $R'$ is a polyvalent aromatic radical of valance n which can have up to about 3 methyl substituents, the total number of carbon atoms in $R'$ being within the range of 6 to about 16.

Examples of some polyhaloaromatic compounds having more than two halogen substituents per molecule include 1,2,3-trichlorobenzene (TCB), 1,2,4-tri-chlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures of any two or more thereof.

In accordance with this second aspect of the invention, the particular method chosen for recovery of the polymer from the polymerization step is important. The polymer in this second aspect should be recovered by the water quench recovery process since, at present, the water quench recovery process is the only recovery process that produces poly(arylene sulfide) fines.

Preparation of Non-Linear Poly(arylene sulfide)

The non-linear poly(arylene sulfide) can be prepared as disclosed in the preparation of linear poly(arylene sulfide) except that some polyhaloaromatic is added with the dihaloaromatic. Examples of some polyhaloaromatic compounds having more than two halogen substituents per molecule are disclosed above.

Common Aspects of Reprecipitation

Though the polymer materials and the purposes of the separate aspects of the invention differ, the reprecipitation process as used in each of these separate aspects are somewhat the same.

It is preferred that the poly(arylene sulfide) (linear, non-linear, or fines) be reprecipitated according to the present invention prior to polymer treatment. Preferably this poly(arylene sulfide0 has not been cured, high temperature treated, calcium cation treated, or treated in such a manner as to deactivate the ends of the polymer chain. If the ends of the polymer chain are deactivated prior to reprecipitation the possibility of chain extension during reprecipitation is precluded. This would limit the possibility of increasing the molecular weight of the polymers through chain extension.

The polymer organic solvents useful in the reprecipitation process can generally be the same solvents as described above for the polymerization process. Again, the preferred polar organic solvent is NMP. The amount of NMP used in the reprecipitation process depends upon the amount of poly(arylene sulfide) (PAS) present in the mixture. Generally, the molar ratio of NMP to PAS is preferably within the range of about 2:1 to 6:1. More preferably about 3:1.

For the purposes of this invention, the molecular weight of PAS for molar ratios is the molecular weight of the repeating unit. When poly(phenylene sulfide)(PPS) is the polymer, the molecular weight for molar ratios is 108. This number is the total molecular weight of 6 carbon atoms, 4 hydrogen atoms, and 1 sulfur atom.

The alkali metal carboxylates employed in the process of this invention can be represented by the formula $R''CO_2M$, where $R''$ is a hydrocarbyl radical selected from alkyl, cycloalkyl, and aryl, and combinations thereof such as alkaryl, aralkyl, and the like, the number of carbon atoms in said $R''$ being within the range of 1 to about 20, and M is an alkali metal selected from lithium, sodium, potassium, rubidium and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octoate, sodium heneicosanoate, lithium cyclohexanecarboxylate, sodium 3-methylcyclopentanecarboxylate, potassium cyclohexacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures of any two or more thereof, sodium acetate being most preferred.

The amount of alkali metal carboxylate generally used in the reprecipitation process depends upon the amount of PAS present in the mixture. Generally, it is preferred that the molar ratio of alkali metal carboxylate to PAS be within the range of about 0.1:1 to 1:1. More preferably about 0.3:1.

The amount of water present initially in the mixture prior to causing the phase separation depends upon the amount needed to stabilize the polymer in the mixture. The amount of water present initially depends upon the type and amount of PAS. Sometimes, it may not be necessary to have any water present initially. Generally, the amount of water present initially will range from about none to about 3 moles water per mole PAS. More preferably, the molar ratio of water to PAS will be within the range of about 0.1:1 to 2:1. Most preferably about 1:1.

The amount of water added to cause a phase separation depends upon the amount and type of solvent and PAS present, and the amount of water, if any, present initially in the mixture. Generally, the molar ratio of water to PAS required to cause a phase separation will be within the range of about 1:1 to 9:1. More preferably the ratio of total water to PAS required to cause a phase separation will be within the range of about 2:1 to 4:1. Most preferably 3:1.

The dispersion temperature of each PAS in the polar organic solvent of the reprecipitation process varies depending upon the materials used. The dispersion temperature is the temperature at which a given polymer dissolves or disperses in a given solvent. The use of the word dispersion can, in some instances, include solution. Each polymer will have different dispersion temperatures depending upon the particular solvent used. The dispersion temperature for PPS, the preferred PAS, in NMP, the preferred polar organic solvent, is about 260° C. Though this temperature depends upon the properties of the particular PPS, such as molecular weight, etc.

The time required for the PAS to be dispersed in the balance of the mixture generally varies depending upon the temperature and the materials used in the mixture. Generally, the time required for the PAS be dispersed in the balance of the mixture ranges from about 1 minute to 1 hour. For most polymers the length of time required to be dispersed in the balance of the mixture will be about 5 minutes to 30 minutes. The length of time that the mixture is held at the dispersion temperature is about 15 minutes for the preferred polymer, PPS in NMP.

Once sufficient water is added to cause a phase separation in the heated mixture, the mixture must be slowly cooled. If the mixture is not slowly cooled, the results are unacceptable. When the polymer mixture is not slowly cooled, polymer deposits upon the cooler reactor surfaces and the quality of the polymer is poor. Generally, this slow cooling ranges about 0.2° to 1° C. per minute until the mixture is cooled to about 200° C., preferably about 150° C. The polymer mixture can be slowly cooled until room temperature, however, slow cooling is usually not required below 100° C. After this slow cooling, the mixture can be rapidly cooled to room temperature.

After the mixture is cooled, the polymer is separated from the rest of the mixture and recovered by standard processes such as water washing, filtering, and drying.

Generally a waste product slime is also generated in the recovery process of the present invention and this waste product can be recycled and treated in the reprecipitation process according to the second aspect of the present invention to recover additional usable PAS.

It is important that the entire reprecipitation process be conducted while the solvent is substantially in liquid phase. Depending upon the dispersion temperature, PAS, and the polar organic solvent the mixture is maintained at a pressure sufficient to maintain the polar organic solvent substantially in liquid phase.

Wet or dry reprecipitated polymer of the present invention can also be treated with polyvalent cations such as calcium. Examples of this type of treatment are disclosed in U.S. Pat. Nos. 4,373,091 and 4,588,789. The disclosures of which are incorporated herein by reference.

The reprecipitated polymer can also be treated with a cation such as calcium in a two step process. This process comprises treatment with aqueous base, such as sodium hydroxide, followed by polyvalent cation treatment such as calcium acetate. More specifically, this two step process entails heating reprecipitated polymer with aqueous sodium hydroxide followed by cooling and recovering the polymer. This polymer is then heated with aqueous calcium acetate, then cooled and recovered.

The molecular weight of the PAS treated according to this invention can be assessed by noting the melt flow after being retained in a barrel of a melt index apparatus under ASTMD 1238 conditions for about 5 minutes at 600° F. The molecular weight is inversely related to the melt flow of the polymer. Melt flow is determined by adding a five kilogram weight to the barrel of the melt index apparatus and weighing the amount of material extruded during a period of time.

EXAMPLES

The following are examples illustrating the process of the present invention. Particular materials employed, species, and conditions are intended to be further illustrative of this invention and not limitative of the reasonable scope thereof.

EXAMPLE I

A linear PPS was made according to the following general process and is identified as polymer A. Aqueous NaOH and aqueous NaSH were premixed and warmed in a separate vessel then charged with a following NMP flush to the reactor containing additional NMP and sodium acetate. This mixture was then subjected to a dehydration step wherein water plus some NMP were removed from the reactor by distillation. Molten DCB (essentially free from TCB) was then charged to the reactor at about 230° C. and held at polymerization conditions until polymerization was essentially complete. Water was then added to the reactor while the reactor mixture was stirred and held at polymerization temperature. The agitated reactor mixture was cooled and diluted with deionized water. The mixture was then in slurry form and was filtered through a metal mesh screen to separate the polymer from the fines. The reaction mixture comprising PPS was washed once with ambient water, rinsed with ambient water, washed with deaerated hot dilute caustic, rinsed with ambient water, washed with ambient deaerated dilute caustic, and then rinsed with ambient water. The PPS recovered from the wash was dried to substantially constant weight.

Another linear PPS was essentially polymerized as above and is identified as polymer B.

EXAMPLE II

Linear PPS Polymers A and B were reprecipitated as follows. To a one gallon stainless steel reactor fitted with an anchor stirrer rotating at about 300 rpm were charged for each mole of linear PPS (repeating unit): 3 to 5 moles of NMP (provided by BASF), 0 to 1 mole water, and about 0.35 moles of sodium acetate.

The reactor was sealed and heated to about 260° C. This temperature was maintained for about 15 to 30 minutes while a sufficient pressure was established. Between 2 and 3 moles of water per mole linear poly(phenylene sulfide) was charged to the reactor while maintaining the reactor temperature. The agitation speed was then increased to an rpm between 450 to 600. The reactor was then cooled at the rate of about 1° C. per minute using air through the coil of the reactor. Opening the reactor revealed granular PPS plus PPS slime. Also, a small amount of polymer was granulated on the reactor coil. The granular polymer was separated from the fines using a 100–200 mesh screen. The granular polymer was washed on the screen and dried in an oven. The fines were recovered from the liquid by filtration.

The following table illustrates linear PPS reprecipitated according to the process above with varying amounts of ingredients.

TABLE I(a)

| Runs | Polymer | NMP | Sodium Acetate | Initial Water | Added Water | Time Maintained at Dispersion Temp. |
|---|---|---|---|---|---|---|
| 1 | B | 4.4 | .38 | 0 | 2.5 | 15 min. |
| 2 | A | 3.3 | .36 | 1.1 | 3.0 | 30 min. |
| 3 | A | 3.4 | .33 | 1.0 | 2.8 | 15 min. |

(a)Values calculated in moles per mole PPS (repeating unit MW 108).

| | | Melt Flow | | | | |
|---|---|---|---|---|---|---|
| | | Original Polymer | | Granular Polymer | | |
| Run | Polymer | Un-treated | $Ca^{++}$ Treated | Un-treated | $Ca^{++}$ Treated | Fines |
| 1 | B | 383 | — | 188 | 154(c) | (b) |
| 2 | A | — | 236 | 210 | — | — |
| 3 | A | — | 236 | 250 | 184(d) | — |

— indicates the material was not tested.
(b)very liquid polymer was running out of the melt flow machine.
(c)reprecipitated polymer was heated to 180° C. with 52 moles H₂O and about .02 moles NaOH (per mole polymer) then cooled and recovered, washed, then heated to 180° C. with 52 moles H₂O and about .02 moles calcium acetate (per mole polymer).
(d)wet reprecipitated polymer was heated to 185° C. with 20 moles $H_2O$ and about .02 moles calcium acetate (per mole polymer unit) for 30 minutes, then cooled, recovered, washed, and dried.

The results in Table I above illustrate that the molecular weight of linear PAS can be increased if treated according to the present invention. The results above also illustrate that calcium cation treatment after reprecipitation is much better than calcium cation treatment before reprecipitation.

EXAMPLE III

A PPS was prepared according to the following general process and is identified as polymer C. Aqueous NaOH and aqueous NaSH were premixed and warmed in a separate vessel then charged with a following NMP flush to the reactor containing additional NMP and sodium acetate. This mixture was then subjected to a dehydration step wherein water plus some NMP was removed from the reactor by distillation. Molten DCB and a small amount of TCB were then charged at the reactor at about 230° C. and held at polymerization conditions until polymerization was essentially complete. Water was then added to the reactor while the reactor mixture was stirred and held at polymerization temperature. The agitated reactor mixture was cooled and diluted with deionzed water. The mixture was then in slurry form and was filtered through a metal mesh screen to separate the polymer from the fines. Washing and drying of the PPS polymer was essentially carried out according to the procedure described in Example I.

EXAMPLE IV

A PPS was prepared according to the general process in Example III above except that TCB and sodium acetate were absent. This PPS is identified as polymer D.

EXAMPLE V

This example shows the benefit of reprecipitating fines according to the present invention. To a two gallon stainless steel reactor fitted with an anchor stirrer at about 300 rpm were charged for each mole (repeating unit) of PPS fines (obtained from polymers C and D): 3 to 4 moles of NMP (provided by BASF), about 1 mole water, and about 0.33 moles of sodium acetate.

The reactor was sealed and heated to 265° C. This temperature was maintained for about 30 minutes while a sufficient pressure was established. Two to three moles of water per mole PAS fines were then charged to the reactor, while maintaining the reactor temperature. The agitation speed was then increased to 500 rpm. The reactor was then cooled at the rate of about 1° C. per minute using air through the coil of the reactor. Opening the reactor revealed granular PPS plus PPS fines. Also, a small amount of polymer was granulated on the reactor coil. The granular polymer was separated from the fines using a 150–200 mesh screen. The granular polymer was washed on the screen and dried in an oven. The fines were recovered from the liquid by filtration.

The following table illustrates poly(phenylene sulfide) fines reprecipitated according to the process above.

TABLE II
FINES REPRECIPITATION RECOVERY YIELD(e)

| Run | Type of Fines From Polymer | NMP (f) | NaOAC (f) | Water Added (f) | Granular Yield | Fines Yield |
|---|---|---|---|---|---|---|
| 1 | C | 3.6 | 00 | 2.5 | 40% | 50% |
| 2 | C | 3.6 | 0.33 | 2.5 | 73% | 19% |
| 3 | C | 3.6 | 0.33 | 2.5 | 71% | 21% |
| 4 | D | 4.0 | 0.33 | 3.0 | 76% | 17% |

(e)The recovery yield of the reprecipitation process was calculated based on the dry weights of the granular particles, fine material and the weight of the parent fines.
(f)values calculated in moles per mole PPS (repeating unit MW 108).

| | | EXTRUSION RATE | | |
|---|---|---|---|---|
| Run | Type of Fines | Original Fines | Granular | Fines |
| 2 | C | 85 | 28 | 330 |
| 4 | D | 325 | 39 | 2120 |

The results in Table II above illustrate that 70 to 75 percent of the parent fines can be recovered as granular particles of increased molecular weight. These granular particles had a significantly reduced ash content, specific conductivity and extrusion rate giving analytical properties that were similar to the parent quenched polymer.

That which is claimed is:
1. A method for increasing the molecular weight of linear poly(arylene sulfide) comprising:
   (a) heating a mixture comprising linear poly(arylene sulfide), polar organic solvent, and alkali metal carboxylate, with or without water, to at least the dispersion temperature of said linear poly(arylene sulfide) in said polar organic solvent;
   (b) maintaining said mixture at about said dispersion temperature for a sufficient length of time for said linear poly(arylene sulfide) to disperse in the balance of the mixture;
   (c) adding sufficient water while maintaining said mixture at about said dispersion temperature to cause a phase separation;
   (d) slowly cooling said mixture and water to at least about 200° C.; and
   (e) recovering a linear poly(arylene sulfide) of increased molecular weight from said mixture.

2. A method according to claim 1 wherein said mixture of (a) contains a sufficient amount of water to stabilize said linear poly(arylene sulfide) but yet not sufficient to cause phase separation.

3. A method according to claim 1 wherein said polar organic solvent is an organic amide.

4. A method according to claim 3 wherein said organic amide is N-methyl-2-pyrrolidone and said dispersion temperature of said linear poly(arylene sulfide) in N-methyl-2-pyrrolidone is about 260° C.

5. A method according to claim 1 wherein said alkali metal carboxylate is an alkali metal acetate.

6. A method according to claim 5 wherein said alkali metal acetate is sodium acetate.

7. A method according to claim 1 wherein said heating is effected under sufficient pressure to maintain said polar organic solvent substantially in liquid phase.

8. A method according to claim 1 wherein said mixture of (d) is slowly cooled until at least about 150° C.

9. A method according to claim 1 wherein said mixture of (d) is slowly cooled at a rate in the range of about 0.2° to about 1° C. per minute.

10. A method according to claim 9 wherein said mixture of (d) is slowly cooled until at least about 100° C.

11. A method according to claim 1 wherein said sufficient length of time for said linear poly(arylene sulfide) to melt and be dispersed in the balance of the mixture is within the range of about 1 minute to 1 hour.

12. A method according to claim 1 wherein the amount of water added in (c) is within the range of about 1 to 9 moles water per mole of linear poly(arylene sulfide).

13. A method according to claim 1 wherein the molar ratio of polar organic solvent to linear poly(arylene sulfide) is within the range of about 2:1 to 6:1 and the molar ratio of alkali metal carboxylate to linear poly(arylene sulfide) is within the range of about 0.1:1 to 1:1.

14. A method according to claim 1 wherein said linear poly(arylene sulfide) is untreated linear poly(phenylene sulfide).

15. A method for increasing the molecular weight of linear poly(arylene sulfide) comprising:
(a) heating a mixture of linear poly(arylene sulfide), N-methyl-2-pyrrolidone, water, and alkali metal acetate to at least the dispersion temperature of said linear poly(arylene sulfide) in said N-methyl-2-pyrrolidone;
(b) maintaining said mixture at about said dispersion temperature for at least about 1 minute to 1 hour, time sufficient for said linear poly(arylene sulfide) to be dispersed in the balance of the mixture;
(c) adding at least about 1 to 9 moles additional water per mole of linear poly(arylene sulfide) while maintaining said mixture at about said dispesion temperature;
(d) slowly cooling said mixture at a rate in the range of about 0.2° to 1° C. per minute until at least about 150° C.; and
(e) recovering a linear poly(arylene sulfide) of increased molecular weight from said mixture;
wherein the amount of water in the mixture of (a) is sufficient to stabilize said linear poly(arylene sulfide) but yet not sufficient to cause phase separation and wherein the amount of water added in (c) is sufficient to cause phase separation.

16. A method according to claim 15 wherein said alkali metal acetate is sodium acetate and said linear poly(arylene sulfide) is untreated linear poly(phenylene sulfide).

17. A method according to claim 15 wherein said mixture of (d) is cooled to at least about 100° C.

18. A method according to claim 15 wherein said linear poly(arylene sulfide) recovered in (e) is then treated with calcium cations.

19. A method according to claim 15 wherein after said linear linear poly(arylene sulfide) of (e) is recovered from said mixture, poly(arylene sulfide) slime which contains poly(arylene sulfide) fines is taken from said mixture and processed through said steps (a)–(e) to recover more linear poly(arylene sulfide) of increased molecular weight.

20. A method according to claim 15 wherein said heating is affected under sufficient pressure to maintain said N-methyl-2-pyrrolidone substantially in liquid phase, the molar ratio of N-methyl-2-pyrrolidone to linear poly(arylene sulfide) is within the range of about 2:1 to 6:1, the molar ratio of alkali metal acetate to linear poly(arylene sulfide) is within the range of about 0.1:1 to 1:1, the molar ratio of water to linear poly(arylene sulfide) in (a) is within the range of about 0:1 to 3:1, and the molar ratio of water to linear poly(arylene sulfide) of (c) is within the range of about 1:1 to 9:1.

21. A method according to claim 20 wherein the molar ratio of water to linear poly(arylene sulfide) in (a) is within the range of about 0.1:1 to 2:1, the molar ratio of water to linear poly(arylene sulfide) of (c) is within the range of about 2:1 to 4:1, and said time sufficient for said linear poly(arylene sulfide) to be dispersed in the balance of the mixture is within the range of about 5 minutes to 30 minutes.

22. A method according to claim 21 wherein the molar ratio of N-methyl-2-pyrrolidone to linear poly(arylene sulfide) is about 3:1, the molar ratio of alkali metal acetate to linear poly(arylene sulfide) is about 0.3:1, the molar ratio of water to linear poly(arylene sulfide) in (a) is about 1:1, and the molar ratio of water to linear poly(arylene sulfide) present in (c) is about 3:1.

23. A method according to claim 22 wherein said linear poly(arylene sulfide) is linear poly(phenylene sulfide), and said alkali metal acetate is sodium acetate.

24. A method for recovering particulate poly(arylene sulfide) from poly(arylene sulfide) fines comprising:
(a) heating a mixture of poly(arylene sulfide) fines, polar organic solvent, alkali metal carboxylate, with or without, to at least the dispersion temperature of said poly(arylene sulfide) fines in said polar organic solvent;
(b) maintaining said mixture at about said dispersion temperature for a sufficient length of time for said poly(arylene sulfide) fines to be dispersed in the balance of the mixture;
(c) adding sufficient water while maintaining said mixture at about said dispersion temperature to cause a phase separation;
(d) slowly cooling said mixture until at least about 200° C.; and
(e) recovering particulate poly(arylene sulfide) from said mixture.

25. A method according to claim 24 wherein said mixture of (a) contains a sufficient amount of water to stabilize said poly(arylene sulfide) fines but yet not sufficient to cuase phase separation.

26. A method according to claim 24 wherein said polar organic solvent is an organic amide.

27. A method according to claim 26 wherein said organic amide is N-methyl-2-pyrrolidone and said dispersion temperature of said poly(arylene sulfide) fines in N-methyl-2-pyrrolidone is about 260° C.

28. A method according to claim 24 wherein said alkali metal carboxylate is an alkali metal acetate.

29. A method according to claim 28 wherein said alkali metal acetate is sodium acetate.

30. A method according to claim 24 wherein said heating is effected under sufficient pressure to maintain said polar organic solvent substantially in liquid phase.

31. A method according to claim 24 wherein said mixture of (d) is slowly cooled until at least about 150° C.

32. A method according to claim 24 wherein said mixture of (d) is slowly cooled at a rate in the range of about 0.2° to about 1° C. per minute.

33. A method according to claim 32 wherein said mixture of (d) is slowly cooled until at least about 100° C.

34. A method according to claim 24 wherein said sufficient length of time for said poly(arylene sulfide) fines to be dispersed in the balance of the mixture is within the range of about 1 minute to 1 hour.

35. A method according to claim 24 wherein the amount of water added in (c) is within the range of about 1 to 9 moles water per mole of poly(arylene sulfide) fines.

36. A method according to claim 24 wherein the molar ratio of polar organic solvent to poly(arylene sulfide) fines is within the range of about 2:1 to 6:1 and the molar ratio of alkali metal carboxylate to poly(arylene sulfide) fines is within the range of about 0.1:1 to 1:1.

37. A method according to claim 24 wherein said poly(arylene sulfide) fines are untreated poly(phenylene sulfide) fines.

38. A method for converting poly(arylene sulfide) fines to particulate poly(arylene sulfide) fines comprising:
(a) heating a mixture of poly(arylene sulfide) fines, N-methyl-2-pyrrolidone, water, and alkali metal acetate to at least the dispersion temperature of said poly(arylene sulfide) fines in said N-methyl-2-pyrrolidone;
(b) maintaining said mixture at about said dispersion temperature for at least about 1 minute to 1 hour, time sufficient for said poly(arylene sulfide) fines to be dispersed in the balance of the mixture;
(c) adding at least about 1 to 9 moles additional water per mole of poly(arylene sulfide) fines while maintaining said mixture at about said dispersion temperature;
(d) slowly cooling said mixture at a rate in the range of about 0.2° to 1° C. per minute to about 150° C.; and
(e) recovering particulate poly(arylene sulfide) from said mixture;
wherein the amount of water in the mixture of (a) is sufficient to stabilize said poly(arylene sulfide) fines but yet not sufficient to cause phase separation and wherein the amount of water added in (c) is sufficient to cause phase separation.

39. A method according to claim 38 wherein said alkali metal acetate is sodium acetate and said poly(arylene sulfide) fines are poly(phenylene sulfide) fines.

40. A method according to claim 38 wherein said mixture of (d) is cooled to at least about 100° C.

41. A method according to claim 38 wherein said linear poly(arylene sulfide) recovered in (e) is then treated with calcium cations.

42. A method according to claim 38 wherein after said particulate poly(arylene sulfide) of (e) is recovered from said mixture, poly(arylene sulfide) slime which contains poly(arylene sulfide) fines is taken from said mixture and processed through said steps (a)–(e) to recover more particulate poly(arylene sulfide).

43. A method according to claim 38 wherein said heating is effected under sufficient pressure to maintain said N-methyl-2-pyrrolidone substantially in liquid phase, the molar ratio of N-methyl-2-pyrrolidone to poly(arylene sulfide) fines is within the range of about 2:1 to 6:1, the molar ratio of alkali metal acetate to poly(arylene sulfide) fines is within the range of about 0.1:1 to 1:1, the molar ratio of water to poly(arylene sulfide) fines in (a) is within the range of about 0:1 to 3:1, and the molar ratio of water to poly(arylene sulfide) fines of (c) is within the range of about 1:1 to 9:1.

44. A method according to claim 43 wherein the molar ratio of water to poly(arylene sulfide) fines in (a) is within the range of about 0.1:1 to 2:1, the molar ratio of water to poly(arylene sulfide) fines of (c) is within the range of about 2:1 to 4:1, and said time sufficient for said poly(arylene sulflide) fines to be dispersed in the balance of the mixture is within the range of about 5 minutes to 30 minutes.

45. A method according to claim 44 wherein the molar ratio of N-methyl-2-pyrrolidone to poly(arylene sulfide) fines is about 3:1, the molar ratio of alkali metal acetate to poly(arylene sulfide) fines in about 0.3:1, the molar ratio of water to poly(arylene sulfide) fines in (a) is about 1:1, and the molar ratio of water to poly(arylene sulfide) fines present in (c) is about 3:1.

46. A method according to claim 45 wherein said poly(arylene sulfide) fines are poly(phenylene sulfide) fines, and said alkali metal acetate is sodium acetate.

47. A method for increasing the molar weight of non-linear poly(arylene sulfide) comprising:
(a) heating a mixture comprising non-linear poly(arylene sulfide), polar organic solvent, and alkali metal carboxylate, with or without water, to at least the dispersion temperature of said non-linear poly(arylene sulfide) in said polar organic solvent;
(b) maintaining said mixture at about said dispersion temperature for a sufficient length of time for said non-linear poly(arylene sulfide) to disperse in the balance of the mixture;
(c) adding sufficient water while maintaining said mixture at about said dispesion temperature to cause a phase separation;
(d) slowly cooling said mixture and water to at least about 200° C.; and
(e) recovering a non-linear poly(arylene sulfide) of increased molecular weight from said mixture.

* * * * *

UNITED STATES PATENT AND TRADEMARK OFFICE
CERTIFICATE OF CORRECTION

PATENT NO.  : 4,748,231
DATED       : May 31, 1988
INVENTOR(S) : Afif M. Nesheiwat It is certified that error appears in the above-identified patent and that said Letters Patent is hereby corrected as shown below:

Claim 15 line 14 delete "dispesion" and insert --dispersion--.
Claim 19 line 2 delete "linear" second occurrence.
Claim 20 line 2 delete "affected" and insert --effected--.
Claim 24 line 4 after "solvent," insert --and--;
Claim 24 line 5 after "without" insert --water--.
Claim 25 line 4 delete "cuase" and insert --cause--.
Claim 44 line 6 delete "sulflide" and insert --sulfide--.
Claim 45 line 4 delete "in" and insert --is--.
Claim 47 line 1 delete "molar" and insert --molecular--;
Claim 47 line 13 delete "dispesion" and insert --dispersion--.

Signed and Sealed this

Twenty-second Day of November, 1988

Attest:

Attesting Officer

DONALD J. QUIGG

Commissioner of Patents and Trademarks